US010347973B2

United States Patent
Kerselaers et al.

(10) Patent No.: US 10,347,973 B2
(45) Date of Patent: Jul. 9, 2019

(54) NEAR-FIELD ELECTROMAGNETIC INDUCTION (NFEMI) ANTENNA

(71) Applicant: NXP B.V., Eindhoven (NL)

(72) Inventors: Anthony Kerselaers, Herselt (BE); Liesbeth Gommé, Anderlecht (BE)

(73) Assignee: NXP B.V., Eindhoven (NL)

( * ) Notice: Subject to any disclaimer, the term of this patent is extended or adjusted under 35 U.S.C. 154(b) by 278 days.

(21) Appl. No.: 15/437,551

(22) Filed: Feb. 21, 2017

(65) Prior Publication Data

US 2018/0241116 A1 Aug. 23, 2018

(51) Int. Cl.
| H01Q 1/24 | (2006.01) |
| H01Q 1/27 | (2006.01) |
| H01Q 1/44 | (2006.01) |
| H01Q 7/00 | (2006.01) |
| H01Q 7/06 | (2006.01) |
| H01Q 7/08 | (2006.01) |
| H01Q 9/26 | (2006.01) |

(Continued)

(52) U.S. Cl.
CPC ............. *H01Q 1/273* (2013.01); *H01Q 1/241* (2013.01); *H01Q 1/44* (2013.01); *H01Q 7/00* (2013.01); *H01Q 7/06* (2013.01); *H01Q 7/08* (2013.01); *H01Q 21/30* (2013.01); *H02J 50/20* (2016.02); *H04B 5/0031* (2013.01); *H04B 5/0081* (2013.01); *H04B 5/0087* (2013.01); *H01Q 9/265* (2013.01); *H01Q 9/30* (2013.01); *H02J 50/23* (2016.02)

(58) Field of Classification Search
CPC ...... H01Q 7/06–08; H01Q 21/30; H02J 50/23
See application file for complete search history.

(56) References Cited

U.S. PATENT DOCUMENTS

| 3,019,335 A | 1/1962 | Brilliant |
| 8,532,568 B2 | 9/2013 | Kerselaers |

(Continued)

FOREIGN PATENT DOCUMENTS

| EP | 2858175 A1 | 4/2015 |
| JP | 63-180223 A | 7/1988 |

(Continued)

OTHER PUBLICATIONS

U.S. Appl. No. 14/836,681; 28 pages; filed Aug. 26, 2015.

(Continued)

*Primary Examiner* — Dameon E Levi
*Assistant Examiner* — Ricardo I Magallanes (57) ABSTRACT

One example discloses a near-field electromagnetic induction (NFEMI) antenna, having: a core; an electric antenna including an electrically conductive surface; a magnetic antenna including a first coil coupled to a second coil; a first feeding connection coupled to one end of the first coil; a second feeding connection coupled to another end of the first coil and coupled to one end of the second coil; wherein the first and second feeding connections are configured to be coupled to an electrical apparatus; wherein another end of the second coil is coupled to the electrically conductive surface; a magnetic permeable material between a first side of the magnetic antenna and the core; and wherein the first coil, the second coil, the magnetic permeable material, and the electrically conductive surface are wrapped around the core.

18 Claims, 5 Drawing Sheets

(51) Int. Cl.
*H01Q 9/30* (2006.01)
*H04B 5/00* (2006.01)
*H01Q 21/30* (2006.01)
*H02J 50/20* (2016.01)
*H02J 50/23* (2016.01)

(56) References Cited

U.S. PATENT DOCUMENTS

| | | | |
|---|---|---|---|
| 8,724,835 | B2 | 5/2014 | Kerselaers et al. |
| 9,197,986 | B1 | 11/2015 | Kerselaers et al. |
| 2009/0189565 | A1 | 7/2009 | Cheng et al. |
| 2011/0275421 | A1 | 11/2011 | Wong et al. |
| 2012/0282857 | A1 | 11/2012 | Zhang |
| 2014/0177863 | A1* | 6/2014 | Parkins ............... H04R 1/1091 381/74 |
| 2014/0184462 | A1* | 7/2014 | Yosui ................. H01Q 7/06 343/788 |
| 2015/0116090 | A1 | 4/2015 | Proehl |
| 2015/0318932 | A1 | 11/2015 | Kerselaers et al. |
| 2015/0319545 | A1 | 11/2015 | Kerselaers et al. |
| 2016/0072558 | A1 | 3/2016 | Hirsch et al. |
| 2017/0028166 | A1 | 2/2017 | Walpole et al. |
| 2017/0125883 | A1* | 5/2017 | Tenno .................. H01Q 7/06 |
| 2017/0202467 | A1 | 7/2017 | Zitnik et al. |
| 2017/0263376 | A1 | 9/2017 | Verschueren et al. |

FOREIGN PATENT DOCUMENTS

| | | |
|---|---|---|
| WO | WO-2015/064693 A1 | 5/2015 |
| WO | WO-2015/164010 A1 | 10/2015 |

OTHER PUBLICATIONS

U.S. Appl. No. 15/146,665; 34 pages; filed May 4, 2016.
Final Office Action; U.S. Appl. No. 15/069,182; 16 pages (dated Nov. 19, 2018).
Non Final Office Action; U.S. Appl. No. 15/069,182; 22 pages (dated Apr. 19, 2018).
Non Final Office Action; U.S. Appl. No. 15/069,182; 15 pages (dated Mar. 11, 2019).

* cited by examiner

NEAR-FIELD ELECTROMAGNETIC INDUCTION (NFEMI) ANTENNA

The present specification relates to systems, methods, apparatuses, devices, articles of manufacture and instructions including an NFEMI antenna.

SUMMARY

According to an example embodiment, a near-field electromagnetic induction (NFEMI) antenna, comprising: a core; an electric antenna including an electrically conductive surface; a magnetic antenna including a first coil coupled to a second coil; a first feeding connection coupled to one end of the first coil; a second feeding connection coupled to another end of the first coil and coupled to one end of the second coil; wherein the first and second feeding connections are configured to be coupled to an electrical apparatus; wherein another end of the second coil is coupled to the electrically conductive surface; a magnetic permeable material between a first side of the magnetic antenna and the core; and wherein the first coil, the second coil, the magnetic permeable material, and the electrically conductive surface are wrapped around the core.

In another example embodiment, the electrically conductive surface is on a second side of the magnetic antenna opposite to the magnetic permeable material.

In another example embodiment, the first and second coils are configured to be magnetically coupled to each other, and to generate or respond to a magnetic field; and the electrically conductive surface is configured to generate or respond to an electric field.

In another example embodiment, the antenna is configured to operate at a carrier communications frequency below 30 MHz or at about 10.6 MHz.

In another example embodiment, the electrically conductive surface includes a gap configured to permit the magnetic antenna to radiate a magnetic signal.

In another example embodiment, the core includes a circumference; and the first coil, the second coil, and the magnetic permeable material encircle the circumference of the core.

In another example embodiment, the coils are wrapped around the magnetic permeable material in either an interleaved pattern, or with the second coil on top of the first coil pattern.

In another example embodiment, the electrically conductive surface is wrapped completely, partially or multiply around the magnetic permeable material and the core.

In another example embodiment, completely around is at least 360 angular degrees; partially is less than 360 angular degrees; and multiply more than 360 angular degrees.

In another example embodiment, . . . .
wherein the core is at least one of: a non-magnetic metallic core, a battery, air, or a solid.

In another example embodiment, the core includes an electrical apparatus; and the electrical apparatus includes at least one of: an integrated circuit (IC), an RF IC, a connector port, a circuit element; a tuning circuit, a receiver circuit and/or a transmitter circuit, a radio circuit, a microprocessor, a digital signal processor, an audio amplifier, a data processing unit, a human interface unit, and/or another antenna.

In another example embodiment, the electrical apparatus coupled to the first and second feeding connections.

In another example embodiment, the core includes an electrical apparatus; and further comprising a conductive layer; wherein the conductive layer is at least one of: between the electrical apparatus and the magnetic permeable material or between the magnetic permeable material and the coils.

In another example embodiment, the magnetic permeable material is configured to permit the core to be inserted and removed.

In another example embodiment, the magnetic permeable material is configured to be permanently attached to the core.

In another example embodiment, the magnetic permeable material is at least one of: a planar sheet, a ferrite shield, a ferrite sheet, a coating comprising ferrite particles in suspension, or a sticker having an adhesive on one side.

In another example embodiment, the magnetic permeable material is configured to: shield the core from magnetic flux generated by the coils; and spatially amplify magnetic flux generated by the coils toward a direction opposite from the core.

In another example embodiment, the magnetic permeable material covers less than all of an outer surface of the core.

According to an example embodiment, a wearable device comprising: a near-field electromagnetic induction (NFEMI) antenna including, a core; an electric antenna including an electrically conductive surface; a magnetic antenna including a first coil coupled to a second coil; a first feeding connection coupled to one end of the first coil; a second feeding connection coupled to another end of the first coil and coupled to one end of the second coil; wherein the first and second feeding connections are configured to be coupled to an electrical apparatus; wherein another end of the second coil is coupled to the electrically conductive surface; a magnetic permeable material between a first side of the magnetic antenna and the core; and wherein the first coil, the second coil, the magnetic permeable material, and the electrically conductive surface are wrapped around the core; and wherein the wearable device is at least one of: a radio system, a wireless device, a hearing aid, or an earbud.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Example embodiments of a near-field electromagnetic induction (NFEMI) communication system can operate near a human body by means of a combination of a magnetic field and electric field without the use of transversal radiating waves. Such NFEMI systems improve a wearable device's signal link budget and extend their range to a complete human body.

Whereas RF wireless communication may be accomplished by propagating an RF plane wave through free space, NFEMI communication utilizes non-propagating quasi-static fields. The quasi-static characteristic of the fields is the result of antenna dimensions in combination with the carrier frequency. The majority of the energy is stored in the form of magnetic and electric fields and a small amount of RF energy inevitably propagates in free space.

Small antenna geometries compared with the carrier wavelength are candidate for near field communication since they do not generate radiating waves in free space. Such an antenna can be a coil antenna that allows near field magnetic induction (NFMI). Other antennas communicate by means of both magnetic and electric near fields via near field electromagnetic induction (NFEMI). Such an antenna when in close proximity to the body will generate fields that are confined near the body.

Figure 1A:
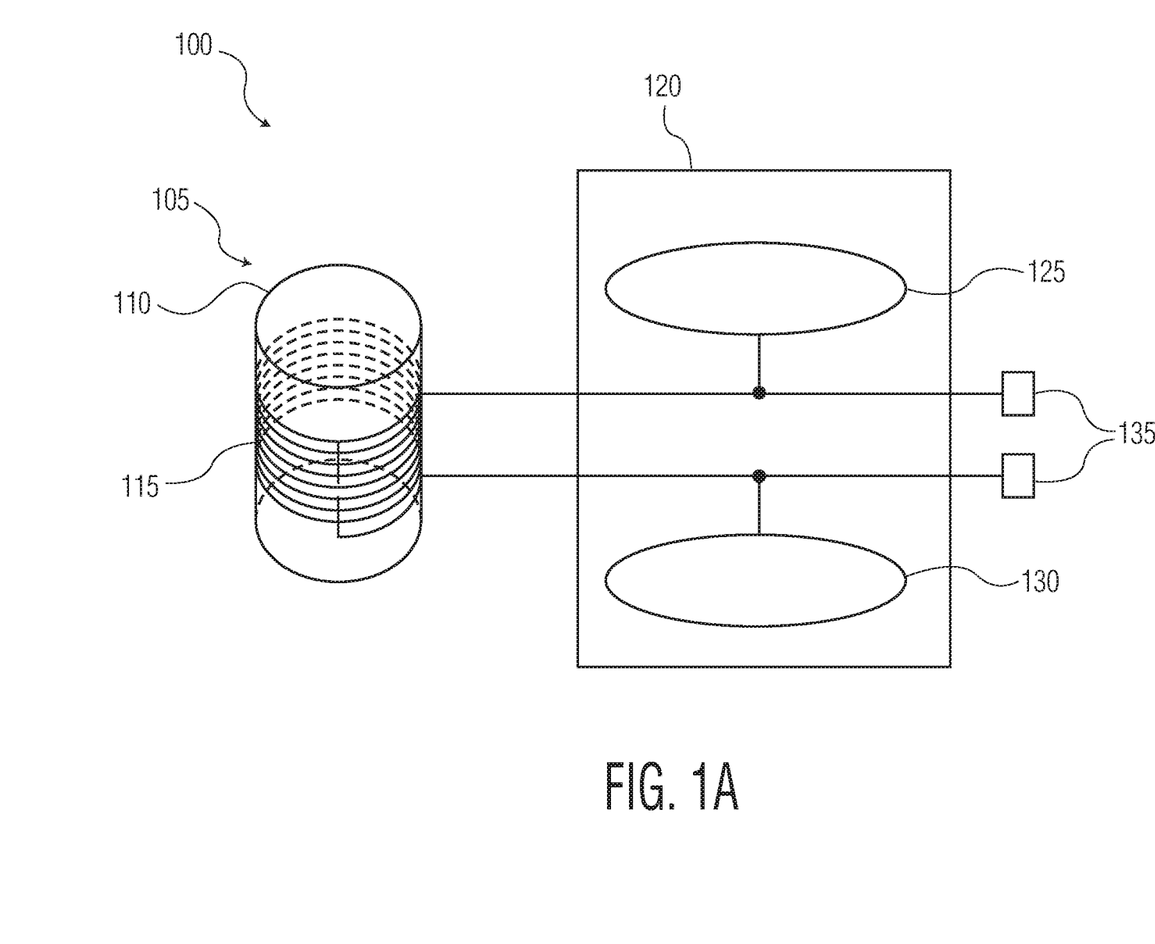
FIG. 1A is an example electrical diagram of a first near-field electromagnetic induction (NFEMI) antenna.

FIG. 1A is an example electrical diagram of a first near-field electromagnetic induction (NFEMI) antenna 100. The NFEMI antenna 100 may include a coil antenna 105 (i.e. a magnetic antenna) in conjunction with a short loaded dipole 120 (i.e. an electric antenna). The coil antenna 105 may include a ferrite core 110 with a wire 115 wound around the core 110. The short dipole 120 may include two loading plates 125 and 130. In close proximity of the body, this antenna will provide fields that are confined near the body. The preferred transmit frequency is below 30 MHz to ensure that the fields are following the body contours and far field radiation is strongly reduced. The coil antenna 105 and two loading plates 125 and 130 are coupled to a first and second signal feed connections 135 which provide electrical connection to a receiver and/or transmitter circuit.

Figure 1B:
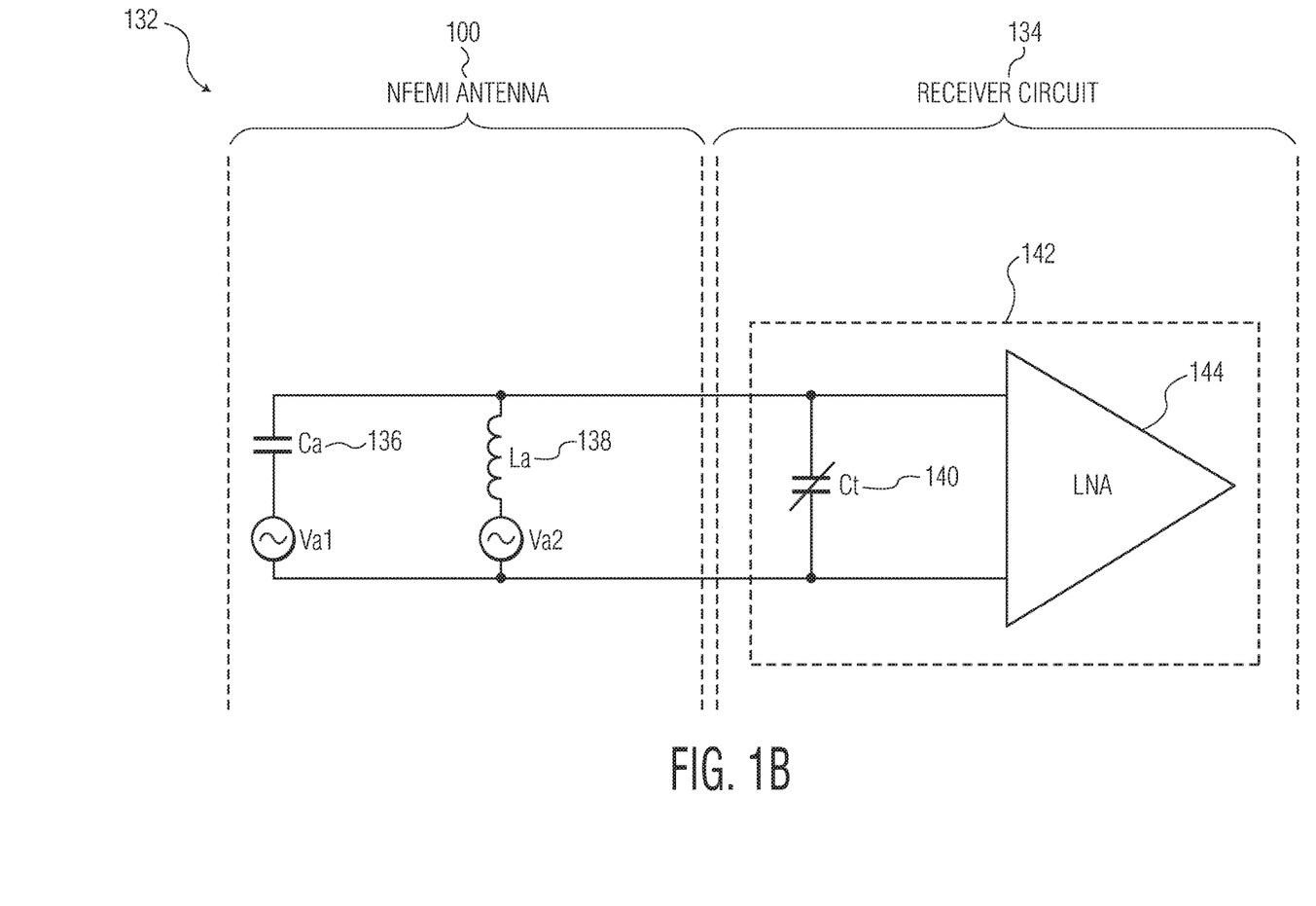
FIG. 1B is an example electrical circuit including the first NFEMI antenna connected to a receiver circuit.

FIG. 1B is an example electrical circuit 132 including the first NFEMI antenna 100 connected to a receiver circuit 134. The equivalent circuit 132 includes an equivalent capacitance (Ca) 136 formed by the two loading plates 125 and 130 of the short loaded dipole 120. An equivalent inductance (La) 138 is formed by the ferrite core 110 and wire 115 of the coil antenna 105.

During operations, near fields in proximity to the NFEMI antenna 100 generates voltage (Va2) in the equivalent inductance (La) 138 and voltage (Va1) in the equivalent capacitance (Ca) 136.

Both antennas 105, 120 are in an electrically parallel configuration and further connected to a tuning capacitor (Ct) 140. The tuning capacitor (Ct) 140 is selected to enable the NFEMI antenna 100 to resonate at an NFEMI carrier frequency. A resistor bank (not shown) in parallel with the tuning capacitor (Ct) 140 adjusts a frequency bandwidth of the circuit 132.

In some example embodiments, the tuning capacitor (Ct) 140 may be embedded within an RF integrated circuit (RF IC) 142 that also includes a low noise amplifier (LNA) 144. Further NFEMI communication functions can be added at a back-end of this circuit 142.

NFEMI devices such as the first NFEMI antenna 100 discussed above use small antenna components compared with a wavelength of the NFEMI carrier frequency. Such small components can be susceptible to interference generated by other mechanical and electrical components, such as the RF integrated circuit (RF IC) 142. Such interference can degrade the NFEMI's device's communications range.

The first NFEMI antenna 100 could be constructed on a ferrite rod with a number of copper windings around it and a conductive surface. Alternatively, an air coil could be used as magnetic antenna. The diameter and surface of the air coil would be much larger compared with a ferrite rod coil based near-field antenna due to lack of magnetic material in its core. Bringing such an air coil close to metallic parts, such as a coin cell battery, would reduce the quality factor (Q) of the near-field antenna 100 considerably due to eddy currents created inside the metal encasing the battery. Both the self-resonance frequency and quality factor of the antenna 100 would be lowered to such a level that the communication distance is reduced or becomes impossible.

Now discussed is a second NFEMI antenna that provides an increased magnetic field strength and an increased electric field strength in transmit mode. The received voltage in receive mode is also increased. The second NFEMI antenna's structure can be integrated into very small wireless portable products near to the human body like wireless audio earbuds or hearing aids, in-ear hearing aids, in-ear-canal hearing aids and others. Applications of devices including the NFEMI antenna include: portable devices, portable devices positioned around a body (e.g. hearing aids, body network devices for healthcare applications), and other devices having NFEMI functionality.

Figure 2:
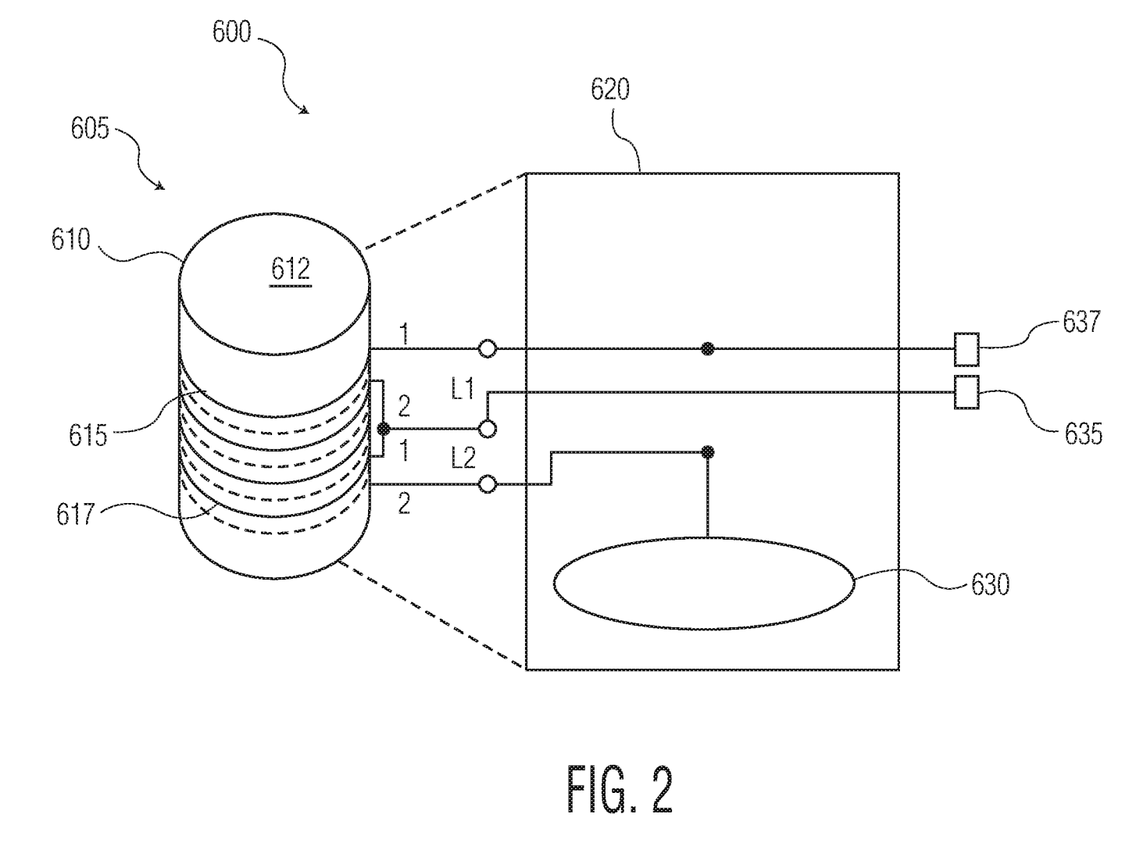
FIG. 2 is an example electrical diagram of a second NFEMI antenna.

FIG. 2 is an example electrical diagram of the second NFEMI antenna 600. The antenna system 600 is a combination of an electrical antenna 620 and a magnetic antenna 605.

The magnetic antenna 605 includes two coupled coils 615 and 617. The first coil 615 has an inductance of L1, and the second coil 617 has an inductance of L2. Both coils 615 and 617 may be connected such that they form a larger inductance compared with the inductance of the first coil 615 and the second coil 617.

Both coils 615 and 617, wrapped around a magnetic permeable material 610 (e.g. a planar sheet, a ferrite shield, a ferrite sheet or a coating comprising ferrite particles in suspension), and the magnetic permeable material 610 is wrapped around a core 612. In one example embodiment, the coils 615 and 617 are wrapped around the first magnetic permeable material 610 in an interleaved fashion. In another example embodiment, the coils 615 and 617 are wrapped on top of one another. In this way, the second coil 617 is first wrapped around the magnetic permeable material 610 and the core 612, and then the first coil 615 is wrapped around the second coil 617, the magnetic permeable material 610 and the core 612.

A first connection of the first coil 615 is connected to a first feeding connection 637. The second connection of the first coil 615 is connected to a first connection of the second coil 617 and to a second feeding connection 635. A second connection of the second coil 617 is connected to an electrically conductive surface 630 within the electric antenna 620.

Figure 3A:
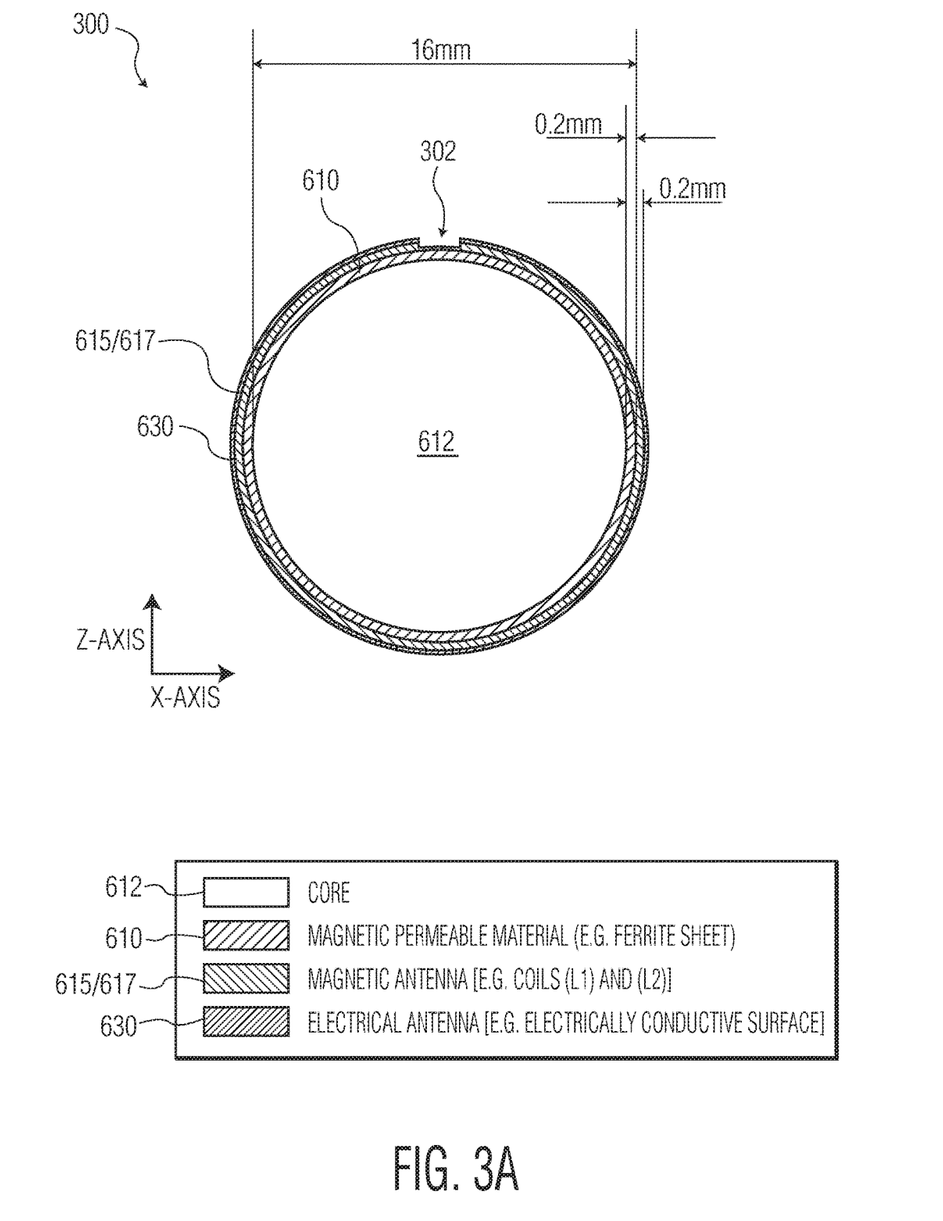
FIGS. 3A, 3B and 3C are different views of an example structure including the second NFEMI antenna.
Figure 3B:
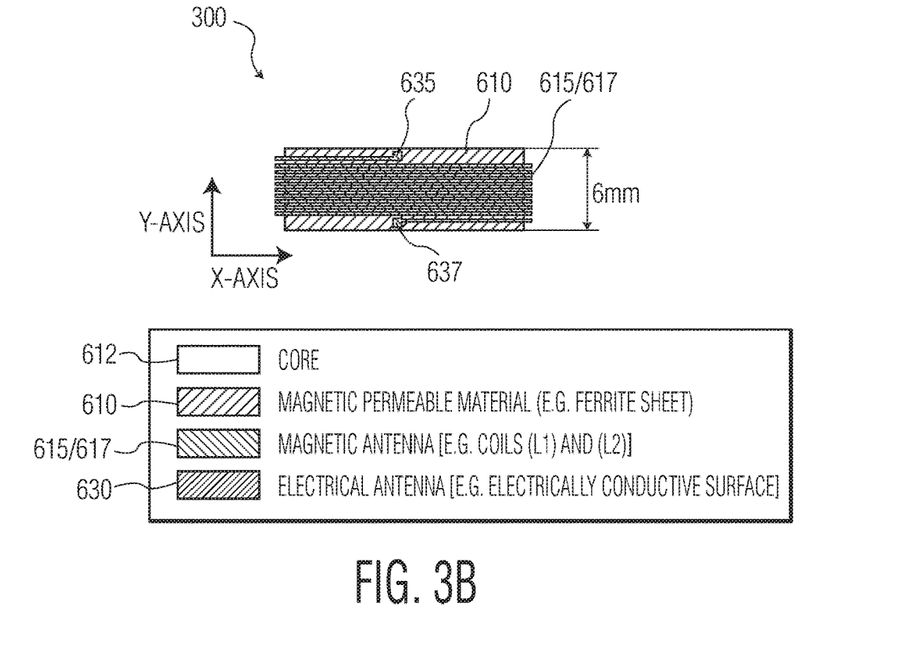
Figure 3C:
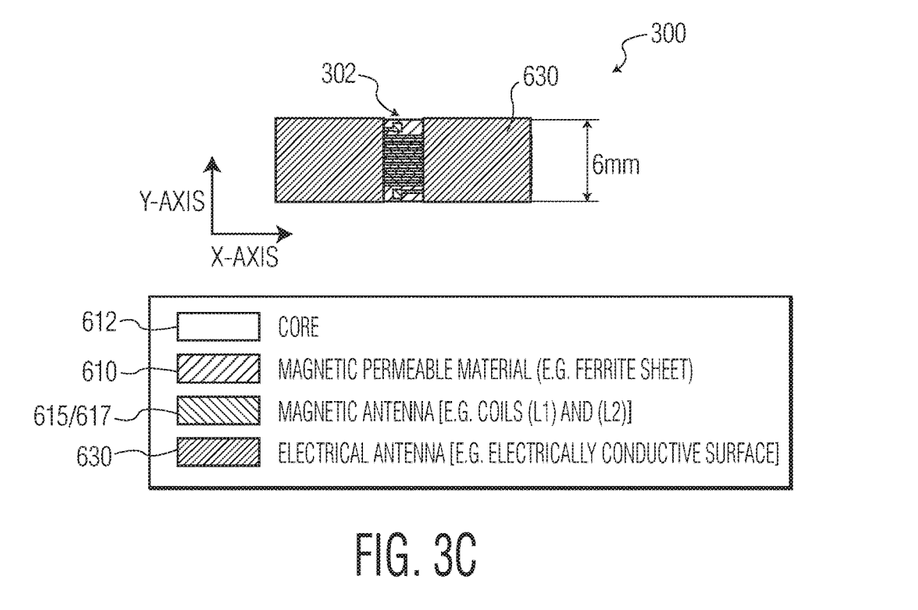

Not shown in FIG. 2, but shown in FIG. 3, the electrically conductive surface 630 is wrapped completely, partially or multiply around the coils 615 and 617, the magnetic permeable material 610 and core 612. In this specification, the phrase "wrapped around" is herein defined to include encircling an object (e.g. core 612) either completely (e.g. by at least 360 angular degrees), partially (e.g. by less than 360 angular degrees) or multiply (e.g. by more than 360 angular degrees, such as several turns of the coils 615 and 617 about the core 612). In some example embodiments, "wrapped around" may only cover, for example, 10 angular degrees about an object such as the core 612. FIG. 2 shows the electrically conductive surface 630 un-wrapped from the coils 615 and 617, the magnetic permeable material 610 and core 612

Note that the core 612 may be of any shape or size. The core 612 may also be at least one of: a non-magnetic metallic core, a battery (e.g. a coin cell battery), or a solid. The core 612 may include various circuitry (e.g. the electrical apparatus referred to herein), and/or other electrical and mechanical parts that may or may not be necessary for functioning of the electrical apparatus or the NFEMI antenna 600.

In various embodiments, the magnetic permeable material 610 may or may not physically touch the core 612. For example, if the core 612 is a replaceable battery, then the magnetic permeable material 610 would need to be sized to permit removal and replacement of the battery. In another example, if the core 612 is a single-use or wirelessly chargeable battery, then the magnetic permeable material 610 can be directly attached to or coated on the battery's outer surface. In either example the magnetic permeable material 610 need not cover all of the non-metallic core's 612 outer surface. Instead the magnetic permeable material 610 could be sized just to reduce any magnetic attenuation of the magnetic coil's 615 and 617 signal by the core 612 to a predefined attenuation level.

In some example embodiments, the feeding connections 637 and 635 are connected to an electrical apparatus (not shown). The electrical apparatus embodiments can include: an integrated circuit (IC), an RF IC, a connector port, or other circuit elements. The circuit elements in the electrical apparatus can include: a tuning circuit having capacitive and resistive tuning banks, a receiver circuit and/or a transmitter circuit. In various example embodiments, the electrical apparatus may also include: radio functionality, a microprocessor, a digital signal processor, an audio amplifier, a data processing unit, a human interface unit, and/or another antenna.

More structural details for various example embodiments of the second NFEMI antenna 600 are now provided.

FIGS. 3A, 3B and 3C are different views of an example structure 300 including the second NFEMI antenna 600. FIGS. 3A, 3B and 3C will be discussed together.

The second NFEMI antenna 600 is shown with the core 612 surrounded by a magnetic permeable material 610, which is then surrounded by the two coupled coils 615 (L1) and 617 (L2), which are then surrounded by the electrically conductive surface 630 having a gap 302.

In some example embodiments, the core 612 can be a non-magnetic metallic core, a battery, air, or a solid. In other example embodiments, the core 612 is an electrical apparatus (not shown). The electrical apparatus can be: an integrated circuit (IC), an RF IC, a connector port, a circuit element; a tuning circuit, a receiver circuit and/or a transmitter circuit, a radio circuit, a microprocessor, a digital signal processor, an audio amplifier, a data processing unit, a human interface unit, and/or another antenna.

The core 612 includes a circumference and the coils 615, 617 and the magnetic permeable material 610 encircle the circumference of the core 612. FIG. 3B shows one example of how the coils 615 (L1) and 617 (L2) can be wrapped around the magnetic permeable material 610 in a way that is substantially perpendicular to the core's 612 axis.

The magnetic permeable material 610 prevents eddy currents in the core 612 structure that would tend to cancel out the magnetic field due to a presence of any metal in the core 612. In other words, the magnetic permeable material 610 forms a low impedance path for magnetic field lines generated by the coils L1, L2 615, 617. The magnetic flux is concentrated in the magnetic permeable material 610 thereby shielding the core 612. The magnetic permeable material 610 also increases an overall inductance of the antenna 600, thus spatially amplifying the magnetic flux away from any electronic components in the core 612, and toward the electrically conductive surface 630, thus improving an energy efficiency and transmission quality of the second NFEMI antenna 600.

The magnetic permeable material 610 need not be contiguous but could have a chessboard, or any other discontinuous layout. In certain example embodiments, the magnetic permeable material 610 can be very thin (e.g. 0.1 mm thick). An example of magnetic permeable material 610 material is 240-2799-ND from manufacturer LAIRD. This example material is very effective for frequencies around 10 MHz. In alternate example embodiments, the magnetic permeable material 610 can be any magnetic permeable material.

In other example embodiments, an additional conductive layer (not shown) can be inserted between the electronic components and the magnetic permeable material to reduce the electric interference generated by the electronic circuit entering the antenna.

The antenna's 600 resonance frequency can be tuned at a carrier frequency using a capacitor bank in the electrical apparatus (not shown). The antenna's 600 bandwidth can be tuned using a resistor bank also in the electrical apparatus. Both capacitive and resistive tuning banks can be integrated into an RF IC (not shown). In one example embodiment, a carrier frequency for communicating the NFEMI signals is 10.6 MHz+/−5 MHz.

If the magnetic permeable material 610 is permanently fixed to the core 612 (e.g. as a planar sheet, a ferrite shield, a ferrite sheet, a coating comprising ferrite particles in suspension, or a sticker having an adhesive on one side), then if the core 612 is a battery, in one example, the battery can even be used as a mechanical holder for the coil's 615 and 617 and the electrically conductive surface 630, which makes it easier and more predictable to produce the near-field antenna 600. The battery will guarantee a diameter and placement of the magnetic and electric antennas in an end product.

In this way the near-field antenna 600 can be created with a large diameter and surface area and hence large sensitivity, with adding only little volume to the end product and without being impacted much by the presence of a metallic parts (such as a coin cell battery core 612) close to the antenna 600. In such an embodiment, there is no need to coat the whole battery, only coating the outside of the battery with a thin layer of a magnetic permeable material 610 is sufficient.

When the electrically conductive surface 630 is placed outside of the coils opposite the core as shown in FIG. 3C, the gap 302 in the electrically conductive surface 630 prevents the electrically conductive surface 630 from shielding the coils 615 and 617 from radiating a magnetic signal to an external environment.

Wearable devices can benefit from this NFEMI antenna's 600 structure. For example, in a space constrained battery powered device, the battery is often the largest component. If a Near-field radio has to be integrated in such a space constrained device, there is often not much choice how and where to position the prior art near-field antenna: typically it will reside very close to the battery. Using the aforementioned NFEMI antenna 600 structure, NFEMI capability can be integrated into small devices such as, wearables, a radio system, a wireless device, a hearing aid, or an earbud.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A near-field electromagnetic induction (NFEMI) antenna, comprising:
   a core;
   an electric antenna including an electrically conductive surface;
   a magnetic antenna including a first coil coupled to a second coil;
   a first feeding connection coupled to one end of the first coil;
   a second feeding connection coupled to another end of the first coil and coupled to one end of the second coil, wherein the first and second feeding connections are configured to be coupled to an electrical apparatus and another end of the second coil is coupled to the electrically conductive surface; and
   a magnetic permeable material between a first side of the magnetic antenna and the core, wherein the first coil and the second coil are wrapped around the magnetic permeable material in an interleaved pattern.

2. The antenna of claim 1, wherein the electrically conductive surface is on a second side of the magnetic antenna opposite to the magnetic permeable material.

3. The antenna of claim 1, wherein the first and second coils are configured to be magnetically coupled to each other, and to generate or respond to a magnetic field, and the electrically conductive surface is configured to generate or respond to an electric field.

4. The antenna of claim 1, wherein the antenna is configured to operate at a carrier communications frequency at about 10.6 MHz.

5. The antenna of claim 1, wherein the electrically conductive surface includes a gap configured to permit the magnetic antenna to radiate a magnetic signal.

6. The antenna of claim 1, wherein the core includes a circumference and the first coil, the second coil, and the magnetic permeable material encircle the circumference of the core.

7. The antenna of claim 1, wherein the electrically conductive surface is wrapped completely, partially, or multiply around the magnetic permeable material and the core.

8. The antenna of claim 7, wherein completely around is at least 360 angular degrees, wherein partially is less than 360 angular degrees, and wherein multiply is more than 360 angular degrees.

9. The antenna of claim 1, wherein the core is at least one of a non-magnetic metallic core, a battery, air, or a solid.

10. The antenna of claim 1, wherein the core includes an electrical apparatus including at least one of an integrated circuit (IC), an RF IC, a connector port, a circuit element; a tuning circuit, a receiver circuit and/or a transmitter circuit; a radio circuit, a microprocessor, a digital signal processor, an audio amplifier, a data processing unit, a human interface unit, and/or another antenna.

11. The antenna of claim 10, wherein the electrical apparatus is coupled to the first and second feeding connections.

12. The antenna of claim 1: wherein the core includes an electrical apparatus, and a conductive layer between the electrical apparatus and the magnetic permeable material is configured to reduce electric interference.

13. The antenna of claim 1, wherein the magnetic permeable material is configured to permit the core to be inserted and removed.

14. The antenna of claim 1, wherein the magnetic permeable material is configured to be permanently attached to the core.

15. The antenna of claim 1, wherein the magnetic permeable material is at least one of: a planar sheet, a ferrite shield, a ferrite sheet, a coating comprising ferrite particles in suspension, or a sticker having an adhesive on one side.

16. The antenna of claim 1, wherein the magnetic permeable material is configured to:
   shield the core from magnetic flux generated by the coils; and
   spatially amplify the magnetic flux generated by the coils toward a direction opposite from the core.

17. The antenna of claim 1, wherein the magnetic permeable material covers less than all of an outer surface of the core.

18. A wearable device comprising a near-field electromagnetic induction (NFEMI) antenna including:
   a core;
   an electric antenna including an electrically conductive surface;
   a magnetic antenna including a first coil coupled to a second coil;
   a first feeding connection coupled to one end of the first coil;
   a second feeding connection coupled to another end of the first coil and coupled to one end of the second coil, wherein the first and second feeding connections are configured to be coupled to an electrical apparatus and another end of the second coil is coupled to the electrically conductive surface; and
   a magnetic permeable material between a first side of the magnetic antenna and the core; and wherein the first coil and the second coil are wrapped around the magnetic permeable material in an interleaved pattern, and the wearable device is at least one of: a radio system, a wireless device, a hearing aid, or an earbud.

* * * * *